US011005802B1

(12) United States Patent
Candelore

(10) Patent No.: US 11,005,802 B1
(45) Date of Patent: May 11, 2021

(54) IMPORTANCE DETERMINATION FOR UNDELIVERED MESSAGES

(71) Applicant: SONY CORPORATION, Tokyo (JP)

(72) Inventor: Brant Candelore, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/912,178

(22) Filed: Jun. 25, 2020

(51) Int. Cl.
*H04L 12/58* (2006.01)

(52) U.S. Cl.
CPC .............. *H04L 51/22* (2013.01); *H04L 51/12* (2013.01); *H04L 51/16* (2013.01); *H04L 51/26* (2013.01)

(58) Field of Classification Search
None
See application file for complete search history.

(56) References Cited

U.S. PATENT DOCUMENTS

| 5,377,354 | A  | * | 12/1994 | Scannell ................. H04L 51/22 706/45 |
| 8,862,680 | B2 | * | 10/2014 | Van Wyck Gould ....................... G08G 5/0026 709/207 |
| 8,892,673 | B1 |   | 11/2014 | Emigh et al. |
| 9,720,493 | B2 | * | 8/2017  | Boss ..................... H04W 52/02 |
| 10,489,457 | B1 | * | 11/2019 | Wulf .................... G06F 16/337 |
| 2002/0042815 | A1 | * | 4/2002 | Salzfass ................. H04L 51/14 709/206 |
| 2009/0070219 | A1 | * | 3/2009 | D'Angelo .......... G06Q 30/0258 705/14.56 |
| 2009/0070334 | A1 | * | 3/2009 | Callahan ............... G06F 21/604 |
| 2013/0080266 | A1 | * | 3/2013 | Molyneux .............. G06Q 10/00 705/14.72 |
| 2014/0181194 | A1 | * | 6/2014 | Sullivan .................. H04L 67/22 709/204 |
| 2015/0180812 | A1 |   | 6/2015  | Wilson |
| 2015/0278764 | A1 | * | 10/2015 | Patil ....................... G06N 20/00 705/301 |
| 2015/0381552 | A1 | * | 12/2015 | Vijay ..................... H04L 43/08 709/206 |
| 2017/0206545 | A1 | * | 7/2017  | Gupta .................... H04L 51/12 |

FOREIGN PATENT DOCUMENTS

WO 2008/015669 A2 2/2008

OTHER PUBLICATIONS

Katherine Bindley, "Getting Attacked by Robotexts? Here's What to Do", The Wall Street Journal, Aug. 22, 2019, 03 pages.

* cited by examiner

*Primary Examiner* — Sargon N Nano
(74) *Attorney, Agent, or Firm* — Chip Law Group

(57) ABSTRACT

An electronic device and method for determination of importance for undelivered messages is provided. The electronic device retrieves a set of messages of a time interval from a stored plurality of messages. The set of messages are associated with a first recipient device of the plurality of recipient devices. The electronic device extracts at least one of body information or sender information from a first message from the retrieved set of messages. The electronic device determines a relationship between a sender of the first message and a user associated with the first recipient device, based on one or more words included in the extracted body information or based on the extracted sender information. The electronic device determines a first importance score for the first message based on the determined relationship. The electronic device transmits the first message to the first recipient device based on the determined first importance score.

20 Claims, 4 Drawing Sheets

IMPORTANCE DETERMINATION FOR UNDELIVERED MESSAGES

CROSS-REFERENCE TO RELATED APPLICATIONS/INCORPORATION BY REFERENCE

None.

FIELD

Various embodiments of the disclosure relate to messaging services. More specifically, various embodiments of the disclosure relate to importance determination for undelivered messages.

BACKGROUND

Recent advancements in the field of communication have led to development of various technologies and systems related to messaging services. One such technology is automated messaging service (also referred as robo-texting). The automated messaging service or robo-texting may allow a system to automatically send multiple messages (for example, related to advertisements, promotional offers, or status updates) to multiple electronic devices (such as, cellular phones). However, in certain situations, such automated message service or robo-texting may lead to receipt of unwanted messages for users associated with the electronic devices. Typically, the electronic device may block the receipt of such unwanted messages based on an identification of a sender of the message. However, in certain cases, blocking of such automated message may lead to a loss of certain important messages, which may not be desired by the user associated with the electronic device. Examples of such important messages may include, but are not limited to bank transaction details, exam registration details, online order updates, e-commerce order updates, or transaction one-time passwords (OTPs). Users associated with the electronic devices (i.e. at recipient end) may desire that such important messages may not be missed, while keeping the unwanted messages to minimum. Therefore, there exists a need for an enhanced system which may effectively manage receipt of such important messages for the user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for importance determination for undelivered messages is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
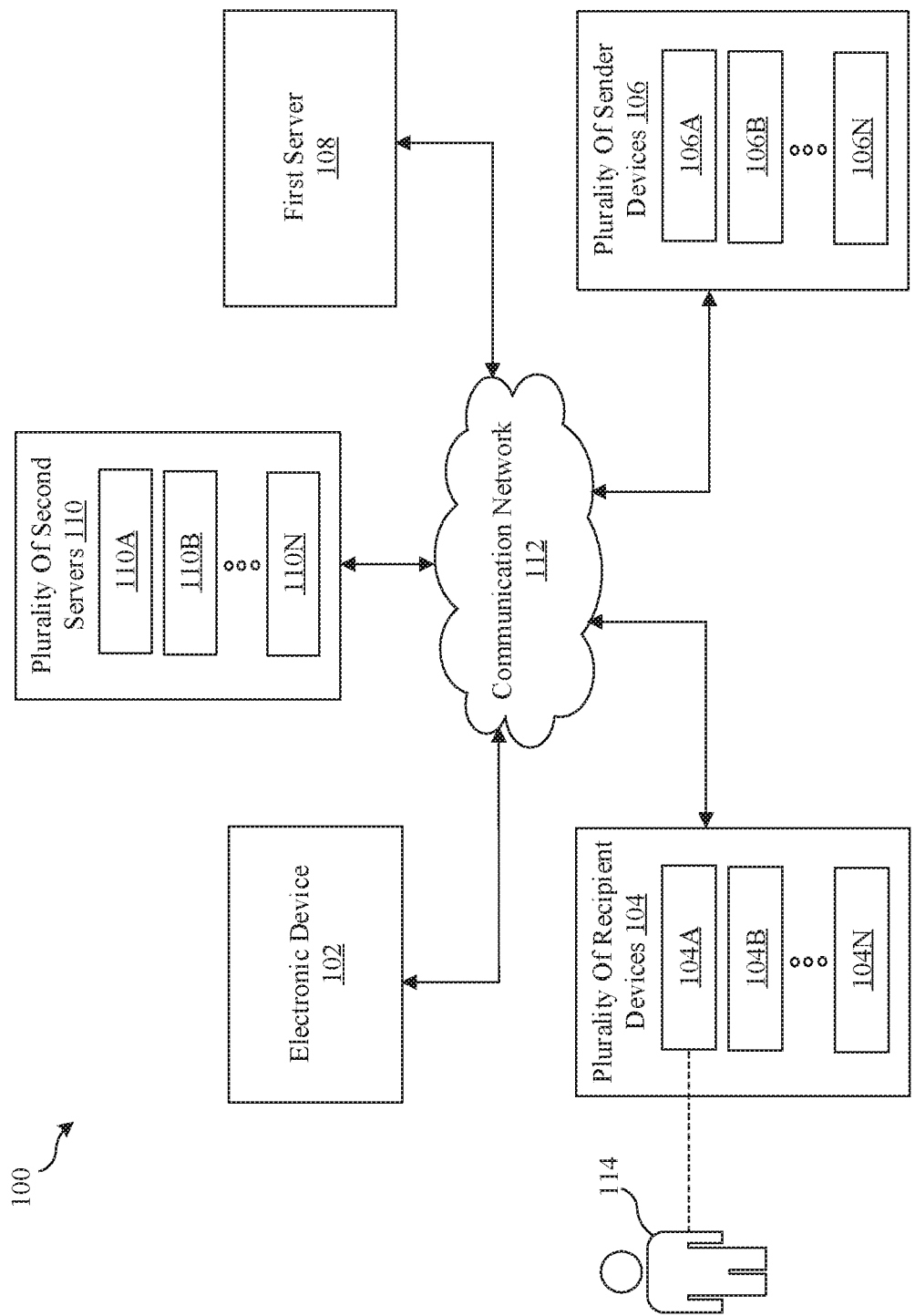
FIG. 1 is a diagram that illustrates an exemplary network environment for importance determination for undelivered messages, in accordance with an embodiment of the disclosure.

The following described implementations may be found in the disclosed electronic device and method for importance determination for undelivered messages. Exemplary aspects of the disclosure provide an electronic device (for example, a smart phone, a messaging server, or a messaging gateway) that may include a memory configured to store a plurality of messages. Each message of the plurality of messages may be an undelivered message (for example, a short message service, or an electronic mail) and may be associated with a recipient device (for example, a smartphone, a server, or a personal computer). The electronic device may be configured to retrieve a set of messages for a time interval (for example, for the last one day, or one week) from the stored plurality of messages. The set of messages may be associated with a first recipient device of the plurality of recipient devices. The electronic device may be further configured to extract at least one of body information (for example, content of the message) or sender information (for example, a contact number associated with a sender of the message device or a contact name associated with the sender) from a first message from the retrieved set of messages.

Based on analysis of one or more words included in the extracted body information or analysis of the extracted sender information, the electronic device may be configured to determine a relationship between a sender of the first message and a user associated with the first recipient device. The electronic device may be further configured to determine a first importance score for the first message based on the determined relationship between the sender of the first message and the user associated with the first recipient device. Certain factors which may be used in the analysis to determine the relationship or the first importance score may include, but are not limited to, schedule information (e.g. flight timing or examination date) associated with the user, information related to past messages sent by the first recipient device to a sender device, Internet browsing history of the first recipient device, or registered services for the user of the first recipient device.

Based on the determined first importance score, the electronic device may be configured to determine an importance of the first message and accordingly transmit the first message (i.e. the undelivered message) to the first recipient device. For example, the electronic device may transmit the undelivered messages to the first recipient device in case the first importance score of each of the undelivered messages is greater than a score threshold. The first recipient device may display the undelivered messages (including for example, the first message) based on the determined importance (i.e., the importance score of a message). Therefore, the disclosed electronic device may enable the user associated with the first recipient device to not miss important messages (for example, but not limited to, alert associated with bank transactions, one time password (OTP) related transaction, exam registration details, and online order updates) which may be undelivered due to one or more message blocking criteria's executed by the electronic device or by the first recipient device.

FIG. 1 is a diagram that illustrates an exemplary network environment for importance determination for undelivered messages, in accordance with an embodiment of the disclosure. With reference to FIG. 1, there is shown a diagram of a network environment 100. The network environment 100 includes an electronic device 102, a plurality of recipient devices 104, and a plurality of sender devices 106. The network environment 100 may further include a first server 108 associated with the plurality of recipient devices 104 and a plurality of second servers 110 associated with the plurality of sender devices 106. The electronic device 102 may be communicatively coupled to the plurality of recipient devices 104, the plurality of sender devices 106, the first server 108, and the plurality of second servers 110, via a communication network 112. The plurality of recipient devices 104 may include a first recipient device 104A, a second recipient device 104B, . . . , and an $N^{th}$ recipient device 104N, as shown in FIG. 1. The first recipient device 104A may be associated with a user 114 as shown in FIG. 1. Similarly, the plurality of sender devices 106 may include a first sender device 106A, a second sender device 106B, . . . , and an $N^{th}$ sender device 106N, as shown in FIG. 1. Further, the plurality of second servers 110 may include a second server 110A, a third server 110B, . . . , and an Nth server 110N. The N number of recipient devices 104, the N number of sender devices 106, and N number of second servers 110 shown in FIG. 1 is presented merely as an example. Further, in FIG. 1, the electronic device 102 and the plurality of recipient devices 104 are shown as two separate devices, however, in some embodiments, the entire functionality of the electronic device 102 may be included in one or more of the plurality of recipient devices 104, without a deviation from scope of the disclosure.

The electronic device 102 may include suitable logic, circuitry, code, and/or interfaces that may be configured to transmit undelivered messages to the plurality of recipient devices 104 based on an importance of each of the undelivered messages. In an embodiment, the electronic device 102 may be configured to retrieve a set of messages of a time interval from a stored plurality of messages. The set of messages may be associated with the first recipient device 104A of the plurality of recipient devices 104. The electronic device 102 may be configured to determine a first importance score for a first message based on a relationship between a sender of the first message and the user 114 associated with the first recipient device 104A. The electronic device 102 may be further configured to transmit the first message to the first recipient device 104A based on the determined first importance score. Examples of the electronic device 102 may include, but are not limited to, a server, a mail server, a messaging server, a web mail server, a messaging gateway, a computing device, a smartphone, a cellular phone, a mobile phone, a personal digital assistant (PDA), a computer work-station, a gaming device, a mainframe machine, and/or a consumer electronic (CE) device.

The plurality of recipient devices 104 may include suitable logic, circuitry, code, and/or interfaces that may be configured to receive a set of messages. The plurality of recipient devices 104 may be further configured to receive a user input from the user 114 associated with the first recipient device 104A. The user input may correspond to a time interval for retrieval of the set of messages from the stored plurality of messages. The plurality of recipient devices 104 may be further configured to transmit the received user input to the electronic device 102 to set the time interval for the retrieval of the set of messages from the stored plurality of messages based on the received user input. As an example, the plurality of recipient device 104 may be configured to perform a Completely Automated Public Turing test to tell Computers and Humans Apart (CAPTCHA)-based challenge-response test to identify whether the sender of a message is a human or an automated robot or machine. In case of the identification of the automated robot or machine, the message may be blocked and undelivered to recipients or users associated with the plurality of recipient devices 104. In some embodiments, the CAPTCHA test may be performed by the electronic device 102 on the plurality of messages received from the plurality of sender devices 106 and the undelivered messages may be further stored for the importance determination. Examples of the plurality of recipient device 104 may include, but are not limited to, a mobile device, a smartphone, a cellular phone, a server, a personal display assistant (PDA), a desktop computer, a laptop, or a computer workstation.

The first server 108 may include suitable logic, circuitry, code, and/or interfaces that may be configured to store a plurality of messages associated with the plurality of recipient devices 104. The first server 108 may receive a request from the electronic device 102 to retrieve the set of messages based on the set time interval. The first server 108 may be further configured to provide the set of messages to the electronic device 102 based on the received request. The first server 108 may further store schedule information (for example, calendar invites of important event such as scheduled flights or examination) corresponding to the user 114 associated with each recipient device (such as, the first recipient device 104A) of the plurality of recipient devices 104. The first server 108 may be further configured to store Internet browsing information related to each recipient device of the plurality of recipient devices 104. The first server 108 may be implemented as a cloud server and may execute operations through web applications, cloud applications, HTTP requests, repository operations, file transfer, and the like. Other example implementations of the first server 108 may include, but are not limited to, a message server, an email server, database server, a file server, a web server, a media server, an application server, a mainframe server, or a cloud computing server.

In at least one embodiment, the first server 108 may be implemented as a plurality of distributed cloud-based resources by use of several technologies that are well known to those ordinarily skilled in the art. A person with ordinary skill in the art will understand that the scope of the disclosure may not be limited to the implementation of the first server 108 and the electronic device 102 as two separate entities. In certain embodiments, the functionalities of the first server 108 can be incorporated in its entirety or at least partially in the electronic device 102, without a departure from the scope of the disclosure.

The plurality of sender devices 106 may include suitable logic, circuitry, code, and/or interfaces that may be configured to transmit a set of messages to the plurality of recipient devices 104. Each message of the set of messages may include body information and sender information associated with a sender of the message. The plurality of sender devices 106 may be configured to transmit the set of messages to the electronic device 102 for the determination of a plurality of importance scores associated with the transmitted set of messages. The electronic device 102 may be configured to transmit one or more messages of the set of messages to corresponding recipient device from the plurality of recipient devices 104, based on a comparison between the determined plurality of importance scores and a score threshold. Examples of the plurality of sender devices 106 may include, but are not limited to, a mobile device, a smartphone, a cellular phone, a server, a personal display assistant (PDA), a desktop computer, a laptop, and a computer workstation.

The plurality of second servers 110 may include suitable logic, circuitry, code and/or interfaces that may be configured to store the sender information corresponding to each sender associated with the plurality of sender devices 106. The plurality of second servers 110 may be associated with each sender device (such as, the first sender device 106A) of the plurality of the sender devices 106. In an example, the second server 110A may be configured to store the sender information corresponding to a sender associated with the first sender device 106A. In another example, the third server 110B may be configured to store the sender information corresponding to another sender associated with the second sender device 106B. In an embodiment, the plurality of second servers 110 may be configured to store information indicative of an association between the sender information and a service. The plurality of second servers 110 may be further configured to store information which may indicate whether the user 114 associated with the first recipient device 104A is registered with the service or not. The plurality of second servers 110 may be further configured to transmit the stored information (i.e. indicative of whether the user 114 associated with the first recipient devices 104A is registered with the service or not) to the electronic device 102 in order to determine the relationship between the sender of the first message and the user 114 associated with the first recipient device 104A based on information received from the plurality of second servers 110. The plurality of second servers 110 may be configured to store a sender list (i.e. associated with the first recipient device 104A) with the stored sender information. The plurality of second servers 110 may be implemented as a cloud server and may execute operations through web applications, cloud applications, HTTP requests, repository operations, file transfer, and the like. Other exemplary implementations of the plurality of second servers 110 may include, but are not limited to, a database server, a file server, a web server, a media server, an application server, a mainframe server, or a cloud computing server.

In at least one embodiment, the plurality of second servers 110 may be implemented as a plurality of distributed cloud-based resources by use of several technologies that are well known to those ordinarily skilled in the art. A person with ordinary skill in the art will understand that the scope of the disclosure may not be limited to the implementation of the plurality of second servers 110 and the plurality of sender devices 106 as two separate entities. In certain embodiments, the functionalities of the plurality of second servers 110 can be incorporated in its entirety or at least partially in the plurality of sender devices 106, without a departure from the scope of the disclosure. In some embodiments, the functionalities of the plurality of second servers 110 can be incorporated in its entirety or at least partially in the electronic device 102, without a departure from the scope of the disclosure.

The communication network 112 may include a communication medium through which the electronic device 102, the plurality of recipient devices 104, the plurality of sender devices 106, the first server 108, and the plurality of second servers 110 may communicate with each other. The communication network 112 may be a wired or wireless communication network. Examples of the communication network 112 may include, but are not limited to, Internet, a Wireless Fidelity (Wi-Fi) network, a Personal Area Network (PAN), a Local Area Network (LAN), or a Metropolitan Area Network (MAN).

Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the first recipient device 104A may receive a first user input and a second user input from the user 114. The first user input may be indicative of a user request to check an importance of a set of messages (such as, the undelivered messages) associated with the first recipient device 104A. The second user input may be indicative of a time interval to retrieve the set of messages from a plurality of messages associated with the first recipient device 104A. The first recipient device 104A may transmit the received first user input and the second user input to the electronic device 102. In other words, the electronic device 102 may be configured to receive the first user input and the second user input. Based on the received first user input and second user input, the electronic device 102 may be configured to set or store the time interval for the retrieval of the set of messages. Examples of the time interval may indicate, but are not limited to, last certain minutes, last certain hours, last certain days, last certain weeks, or last certain months.

In accordance with an embodiment, the electronic device 102 may be configured to retrieve the set of messages of the time interval from the stored plurality of messages. The set of messages may be associated with the first recipient device 104A of the plurality of recipient devices 104. In some embodiments, the electronic device 102 may be configured to retrieve the set of messages from the first server 108. In one or more embodiments, the set of messages may be stored in a storage (such as a memory 204 in FIG. 2) associated with the electronic device 102. In such case, the electronic device 102 may be configured to retrieve the set of messages from the storage associated with the electronic device 102.

In accordance with an embodiment, the electronic device 102 may be further configured to store the plurality of messages which may be undelivered messages and may be associated with the plurality of recipient devices 104. The undelivered message may include, but is not limited to, an electronic mail (e-mail), a short message service (SMS) message, a multimedia message service (MMS) message, or an instant message. In an embodiment, the undelivered messages may correspond to automated messages, robo-text messages or spam messages which may be undelivered to the plurality of recipient devices 104. For example, the undelivered messages may be the messages which may have failed the CAPTCHA test at the end of the plurality of recipient devices 104 or at the end of the electronic device 102.

In accordance with an embodiment, the electronic device 102 may be configured to extract at least one of body information or sender information from a first message from the retrieved set of messages. Each message of the set of messages may include the body information or the sender information associated with a sender of the corresponding message. The extracted body information may include one or more words (such as content or text of the message). The electronic device 102 may be configured to retrieve the one or more words included in the extracted body information. The sender information may include a phone number a contact name, or a unique identifier associated with a sender device. The extraction of the body information or the sender information is described, for example, in FIG. 3.

In accordance with an embodiment, the electronic device 102 may be configured to determine a relationship between a sender of the first message and the user 114 associated with the first recipient device 104A, based on analysis of the one or more words included in the extracted body information or based on the extracted sender information. The determination of the relationship between the sender of the first message and the user 114 associated with the first recipient device 104A is described, for example, in FIG. 3.

In accordance with an embodiment, the electronic device 102 may be configured to determine a first importance score for the first message based on the determined relationship between the sender of the first message and the user 114 associated with the first recipient device 104A. The determination of the first importance score for the first message is described, for example, in FIG. 3. Based on the determined first importance score, the electronic device 102 may be configured to transmit the first message (as an important message) to the first recipient device 104A. The first recipient device 104A may be configured to display the first message on a display screen associated with the first recipient device 104A. The determined first importance score may be different for different messages and for different users based on user preferences and context. For example, a first importance score for a message including information about an e-commerce order may be higher for a first user, than a second user. Thus, the disclosed electronic device 102 may provide automatic retrieval of the set of undelivered messages and transmission of one or more messages of the set of messages based on the determined importance score. Therefore, the electronic device 102 may ensure that the user 114 associated with the first recipient device 104A may not miss important messages (such as, but not limited to, bank transaction details, exam registration details, online order updates, e-commerce order updates, or transaction one-time passwords (OTPs)) even if the important messages may be initially undelivered or blocked due to one or more message restriction settings (for example a message CAPTCHA test). Further, the electronic device 102 may restrict or block the transmission of unwanted messages (i.e. with low importance score) the first recipient device 104A or the plurality of recipient devices 104.

Figure 2:
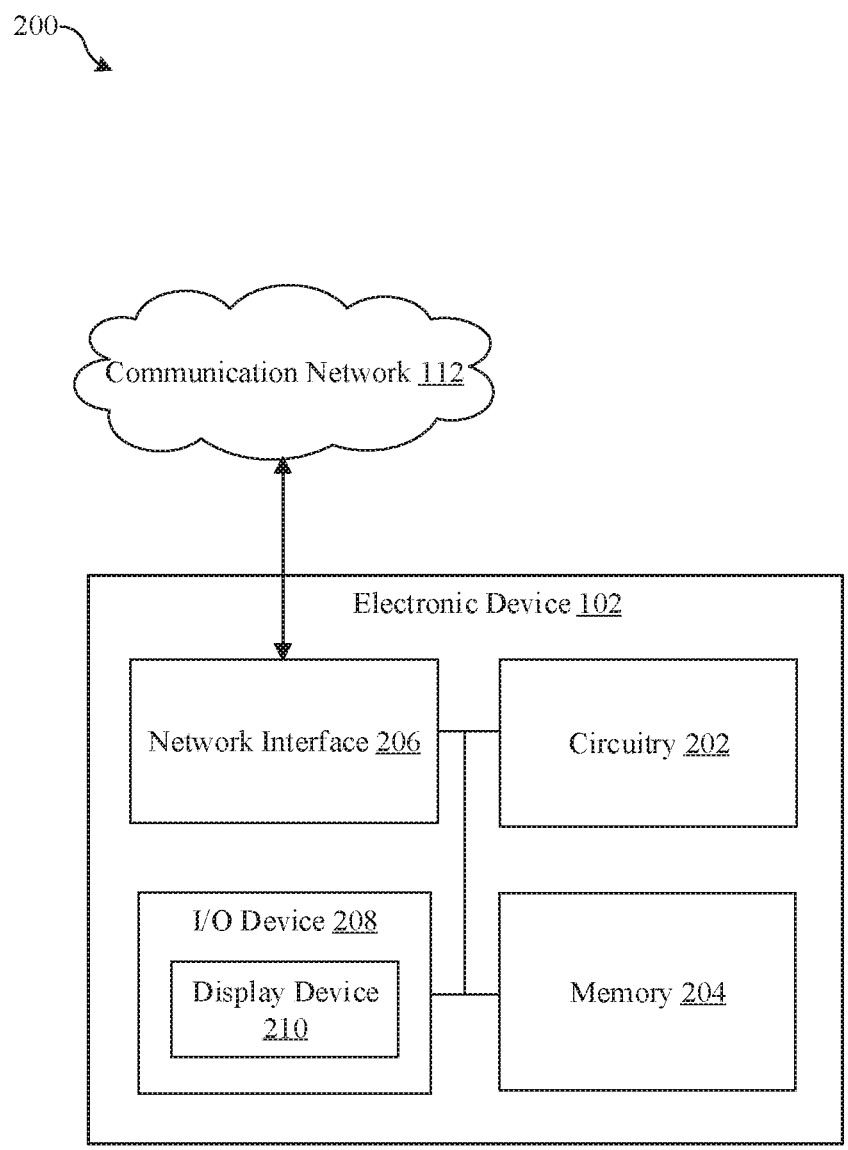
FIG. 2 is a block diagram that illustrates an exemplary electronic device for importance determination for undelivered messages, in accordance with an embodiment of the disclosure.

FIG. 2 is a block diagram that illustrates an exemplary electronic device for importance determination for undelivered messages, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, and a network interface 206. The electronic device 102 may further include an I/O device 208 that may include a display device 210. The circuitry 202 may be communicatively coupled to the memory 204, the network interface 206 and the I/O device 208.

The circuitry 202 may include suitable logic, circuitry, and/or interfaces that may be configured to execute program instructions associated with different operations to be executed by the electronic device 102. For example, some of the operations may include retrieval of the set of messages from the stored plurality of messages, extraction of the body information or the sender information from the first message, determination of the relationship between the sender of the first message and the user 114 of the first recipient device 104A. The operations may further include determination of the first importance score for the first message based on the determined relationship, and the transmission of the first message to the first recipient device 104A based on the determined importance score. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may include, but are not limited to an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, and/or interfaces that may be configured to store the program instructions to be executed by the circuitry 202. In at least one embodiment, the memory 204 may be configured to store the plurality of messages which may undelivered messages and may be associated with the plurality of recipient devices 104. The memory 204 may be further configured to store information associated with the plurality of recipient devices 104. Example of the stored information may include, but is not limited to, the schedule information related to the users of the plurality of recipient devices 104, information related to past messages sent by the first recipient device 104A to a sender device, Internet browsing history of the recipient device, or registered services for the user 114 of the first recipient device 104A. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may include suitable logic, circuitry, and/or interfaces that may be configured to facilitate a communication between the circuitry 202, the plurality of recipient devices 104, the plurality of sender devices 106, the first server 108, and the plurality of second servers 110, via the communication network 112. The network interface 206 may be implemented by use of various known technologies to support wired or wireless communication of the electronic device 102 with the communication network 112. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 206 may be configured to communicate via wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The I/O device 208 may include suitable logic, circuitry, code, and/or interfaces that may be configured to receive an input and provide an output based on the received input. The I/O device 208 may include various input and output devices that may be configured to communicate with the circuitry 202. Examples of the I/O device 208 may include, but are not limited to, a touch screen, a keyboard, a mouse, a joystick, a microphone, a display device (such as, the display device 210), and a speaker.

The display device 210 may comprise suitable logic, circuitry, and/or interfaces that may be configured to display an output of the electronic device 102. In some embodiments, the display device 210 may be an external display device associated with the electronic device 102. In some embodiments, the entire functionality of the electronic device 102 may be included in the plurality of recipient devices 104, and the display device 210 may be utilized to render the first message on the plurality of recipient devices 104. The display device 210 may be a touch screen which may enable the user 114 to provide a user-input via the display device 210. The touch screen may be at least one of a resistive touch screen, a capacitive touch screen, a thermal touch screen or any other touch screen using which inputs can be provided to the display device 210 or the circuitry 202. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices.

The functions or operations executed by the electronic device 102, as described in FIG. 1, may be performed by the circuitry 202. Operations executed by the circuitry 202 are described in detail, for example, in FIGS. 3 and 4.

Figure 3:
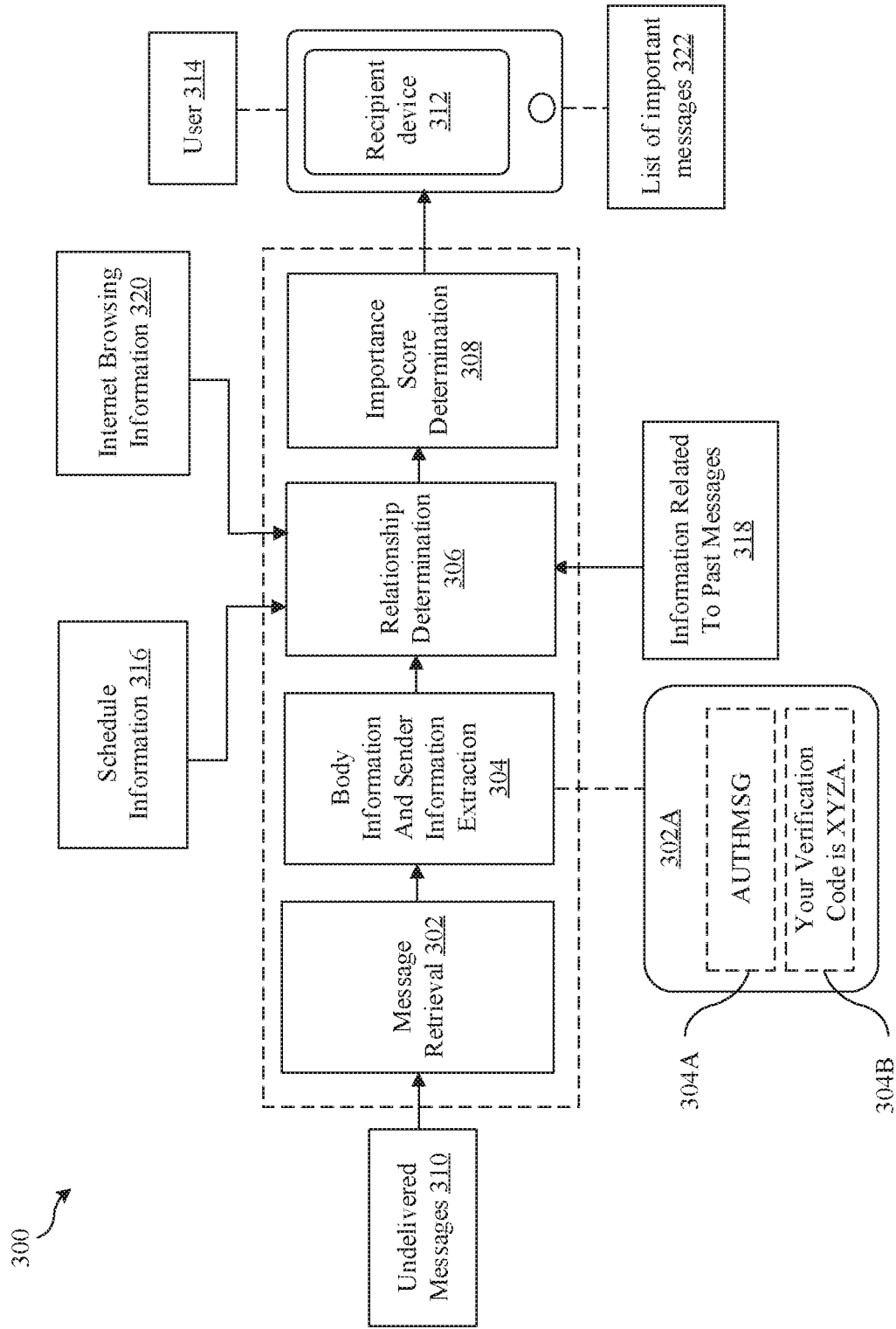
FIG. 3 is a diagram that illustrates exemplary operations for importance determination for undelivered messages, in accordance with an embodiment of the disclosure.

FIG. 3 is a diagram that illustrates exemplary operations for importance determination for undelivered messages, in accordance with an embodiment of the disclosure. FIG. 3 is explained in conjunction with elements from FIG. 1 and FIG. 2. With reference to FIG. 3, there is shown a block diagram 300 that illustrates exemplary operations 302 to 308, as described herein. The exemplary operations illustrated in the block diagram 300 may start at 302 and may be performed by any computing system, apparatus, or device, such as by the electronic device 102 of FIG. 1 or FIG. 2. Although illustrated with discrete blocks, the exemplary operations associated with one or more blocks of the block diagram 300 may be divided into additional blocks, combined into fewer blocks, or eliminated, depending on implementation of the exemplary operations.

At 302, a message may be retrieved. In one or more embodiments, the circuitry 202 may be configured to retrieve a set of messages of a time interval from a plurality of messages. In an embodiment, the memory 204 may be configured to store the plurality of messages that may correspond to undelivered messages 310 and may be associated with a recipient device 312 (for example similar to the first recipient device 104A in FIG. 1). The undelivered messages 310 may be messages which may not be transmitted or delivered to the recipient device 312 in past. The circuitry 202 may be configured to receive a user input from the recipient device 312, such that the user input may be indicative of the time interval at which the set of messages may be retrieved. Based on the received user input, the circuitry 202 may be further configured to set the time interval for the retrieval of the set of messages from the stored plurality of messages. Examples of the time interval may include, but are not limited to, last certain minutes, last certain hours, last certain days, last certain weeks, or last certain months. For example, the time interval of 2 days may indicate that the circuitry 202 may retrieve the set of messages associated with the recipient device 312 and which may be received or undelivered in last 2 days. In other examples, the set of messages may be retrieved once a day, once a week, once a month, or in bi-weekly basis, and the like. In some embodiments, the circuitry 202 may set the time interval in the memory 204 and may retrieve the set of messages based on the set time interval. In some embodiments, the circuitry 202 may determine the time interval based on a frequency or a number of undelivered messages stored in the memory 204. For example, in case the number of undelivered messages received or stored in a day are high (or more than a threshold number), the circuitry 202 may determine or set the time interval as one day for a particular recipient device associated with the undelivered messages. In an embodiment, the threshold number may be indicated by the user input received from the recipient device 312. In such case, the circuitry 202 may receive the threshold number from the recipient device 312, to retrieve the set of messages for importance determination, whenever the number of messages exceeds the threshold number.

In accordance with an embodiment, the undelivered messages 310 may correspond to, but is not limited to, an electronic mail (e-mail), a short message service (SMS) message, a multimedia message service (MMS) message, or an instant message. In an embodiment, the undelivered messages 310 may include a plurality of messages that failed a message CAPTCHA test between the recipient device 312 and a sender device (such as, one of the plurality of sender devices 106). The CAPTCHA test may correspond to a challenge-response test, which may allow the circuitry 202 to identify whether a sender of the message corresponds to a human or an automated robot or a machine. Examples of the CAPTCHA test may include, but are not limited to, an image-based challenge-response test, an audio-based challenge-response test, a text-based challenge-response test, or a number-based challenge-response test.

As the CAPTCHA test, based on the receipt a message (such as, a SMS) from the sender device, the circuitry 202 may be configured to transmit a challenge question (such as, the CAPTCHA question, for example "what is 2+2", or which flower is shown in image, or like) to the sender device (such as, one of the plurality of sender devices 106). In such an example, when a sender associated with the sender device responds with a correct answer (say through another text message or response) to the CAPTCHA question, the circuitry 202 may be configured to transmit the message to the recipient device 312. In such a case, the circuitry 202 may be further configured to identify the sender as a human. Alternatively, when a sender associated with the sender device responds with an incorrect answer or does not respond to the CAPTCHA question, the circuitry 202 may be configured to store the message to the memory 204, as the undelivered message and identify the sender as an automated robot, or machine. In an example, the incorrect response to the CAPTCHA question may be also due to human errors. In such cases, the user 314 associated with the recipient device 312 may miss some important messages (for example, but is not limited to, exam registration details, bank transaction details, or order updates) irrespective of the sender as human or robot.

At 304, body information and sender information may be extracted. In one or more embodiments, the circuitry 202 may be configured to extract at least one of sender information 304A or body information 304B from a first message 302A from the retrieved set of messages. The circuitry 202 may be further configured to extract at least one of the body information 304B or the sender information 304A using various techniques. Examples of such techniques may include, but are not limited to, data mining techniques, natural language processing techniques, or other known data processing techniques. The extracted sender information 304A may include, but is not limited to, a name of the sender of the first message 302A, a phone number of the sender device of the first message 302A, an email address of the sender, or other information associated with a sender associated with a sender device (such as, the first sender device 106A). The extracted body information 304B may include, but is not limited to, a content of the first message 302A, or a subject matter of the first message 302A. As shown in FIG. 3, the first message 302A may correspond to a SMS. In FIG. 3, for example, there is shown the sender information 304A such as "AUTHMSG" and the body information 304B as "Your verification code is XYZA".

At 306, a relationship may be determined. In one or more embodiments, the circuitry 202 may be configured to determine a relationship between a sender of the first message 302A and the user 314 associated with the recipient device 312. The circuitry 202 may be configured to determine the relationship between the sender of the first message 302A and the user 314 associated with the recipient device 312, based on one or more words included in the extracted body information 304B or based on the extracted sender information 304A. The circuitry 202 may be configured to determine the relationship between the sender of the first message 302A and the user 314 associated with the recipient device 312 using natural language processing of the one or more words included in the extracted body information 304B. The relationship between the sender of the first message 302A and the user 314 associated with the recipient device 312 may include information such as, but is not limited to, a number of messages received by the recipient device 312 from the sender device, a number of messages transmitted from the recipient device 312 to the sender device, whether the user 314 of the recipient device 312 is registered with services provided by the sender associated with the sender device, or the sender may be known or important for the user 314 of the recipient device 312. Certain factors which may be used to determine the relationship may include, but are not limited to, schedule information 316 of the user 314, information related to past messages 318 sent by the recipient device 312 to a sender device, Internet browsing information 320 of the recipient device 312, or registered services for the user 314 of the recipient device 312.

In accordance with an embodiment, the circuitry 202 may be configured to retrieve the schedule information 316, corresponding to the user 314 associated with the recipient device 312, from a server (such as, the first server 108). The schedule information 316 may correspond to a scheduled plan associated with the user 314. The schedule information 316 may include, but is not limited to information associated with a calendar invite (such as for scheduled flights, or important meetings/events) of the user 314, timing information associated with a date for payment of various bills (or expenses) such as, an electricity bill or a credit card bill, or may further include timing information associated with examination of the user 314. In an embodiment, the circuitry 202 may be configured to retrieve the schedule information 316 from a server (such as, the first server 108) associated with the recipient device 312. In another embodiment, the circuitry 202 may be configured to retrieve the schedule information 316 from a memory (such as, the memory 204) associated with the electronic device 102. Based on the retrieved schedule information 316 and the one or more words included in the extracted body information 304B, the circuitry 202 may be configured to determine the relationship between the sender of the first message 302A and the user 314 associated with the recipient device 312. In an embodiment, the circuitry 202 may be configured to analyze the schedule information 316 and the one or more words included in the extracted body information 304B in order to determine whether the first message 302A is relevant to the user 314 associated with the recipient device 312 or not. Based on such analysis, the circuitry 202 may be configured to determine the relationship between the sender of the first message 302A and the user 314 associated with the recipient device 312. In an example, the retrieved schedule information 316 may include a date associated with bill payment of a credit card and the body information 304B (of the first message 302A) may include a reminder associated with the payment of the same credit card. Based upon the analysis or comparison of the retrieved schedule information 316 and the one or more words included in the extracted body information 304B, the circuitry 202 may determine the first message 302A as relevant message for the user 314 associated with the recipient device 312 and therefore, the sender (for example a bank) of the first message 302A may be related to the user 314 or in relationship with the user 314 who may be a registered customer of the sender of the first message 302A. The circuitry 202 may be configured to perform natural language processing or textual analysis between the words included in the schedule information 316 and the one or more words included in the extracted body information 304B to determine the relationship between the sender of the first message 302A and the user 314 associated with the recipient device 312.

In another example, the retrieved schedule information 316 may include a date for an upcoming examination of the user 314 of the recipient device 312 and the one or more words in the body information 304B of the first message 302A may indicate an important update (such as, but not limited to, an examination venue details, or an entrance code to enter the examination venue) about the same examination. In such example, the circuitry 202 may compare or analyze the words (such as examination name, date, examination ID, or other details) in the schedule information 316 and in the body information 304B to determine that the user 314 of the recipient device 312 may in relationship with (or known to) the sender (say as an examination authority) of the first message 302A, even if the sender is the human or robot/machine.

In accordance with an embodiment, the circuitry 202 may be further configured to retrieve the information related to past messages 318 transmitted from the recipient device 312 to a sender device (such as, the first sender device 106A) to determine the relationship. The retrieved information related to past messages 318 may be associated with the sender information 304A (i.e. phone number or contact name) extracted from the first message 302A. The circuitry 202 may be further configured to compare the retrieved information related to the past messages 318 and the sender information 304A extracted from the first message 302A. Based on the comparison, the circuitry 202 may be configured to determine the relationship between the sender of the first message 302A and the user 314 associated with the recipient device 312. The information related to past messages 318 may correspond to a number of the past messages transmitted in a first time-period (for example in last certain hours, days or weeks) from the recipient device 312 to the sender device (such as, the first sender device 106A). In an example, the circuitry 202 may be configured to retrieve the information related to past messages 318 from the first server 108 associated with the recipient device 312. In another example, the circuitry 202 may be configured to retrieve the information related to past messages 318 from, the memory 204. In an embodiment, the circuitry 202 may be configured to analyze the information related to the number of the past messages transmitted in the first time-period from the recipient device 312 to the first sender device 106A and the sender information 304A, for the comparison. For example, the analysis may indicate that in recent past, the multiple messages may be transmitted from the recipient device 312 to the first sender device 106A indicated by the extracted sender information 304A of the first message 302A (i.e. undelivered message). The analysis performed by the disclosed electronic device 102 may determine that the sender of the first sender device 106A may be known or in relationship with the user 314 of the recipient device 312. Such analysis may be performed based on the comparison of the sender information 304A in the first message 302A with recipient information (i.e. phone number or contact names) included in the past messages sent to the first sender device 106A from the recipient device 312. In an embodiment, when the number of the past messages transmitted in the first time-period from the recipient device 312 to the first sender device 106A is higher than a threshold value of a number of the past messages, the first message 302A may correspond to a more relevant or important message for the recipient device 312. For example, the first message 302A is an update message (about a recent pizza order) originated from an automated machine or robot (like the first sender device 106A). The electronic device 102 may determine that in last few hours (i.e. first time-period), multiple messages or calls (for example three messages or calls above the threshold value of two) were transmitted from the recipient device 312 to the first sender device 106A to place or enquire about the pizza order, where the sender information 304A of the first message 302A and the multiple past messages/call match with each other. Therefore, based on the analysis, the electronic device 102 may determine that the sender (for example a pizza company) of the first message 302A is in current relationship with the user 314 (i.e. current customer of the pizza order) of the recipient device 312. In another embodiment, when the number of the past messages transmitted in the first time-period from the recipient device 312 to the first sender device 106A is lower than a threshold value of a number of the past messages, the first message 302A may correspond to a less relevant message and the sender of the first message 302A may not be in relationship with the user 314 associated with the recipient device 312.

In an embodiment, the circuitry 202 may be further configured to retrieve the Internet browsing information 320 related to the recipient device 312 from one of a server (such as, the first server 108) or from the recipient device 312 to determine the relationship. Based on the retrieved Internet browsing information 320, the one or more words included in the extracted body information 304B, and/or the extracted sender information 304A, the circuitry 202 may be configured to determine the relationship between the sender of the first message 302A and the user 314 associated with the recipient device 312. In an example, the circuitry 202 may be configured to retrieve the Internet browsing information 320 of the recipient device 312, from the first server 108. In another example, the circuitry 202 may be configured to retrieve the Internet browsing information 320 from the memory 204 associated with the electronic device 102 or a memory associated with the recipient device 312. In an embodiment, the circuitry 202 may be configured to analyze the information related to a browsing history of the user 314 in the first time-period (say in last certain days or hours) using the recipient device 312, in order to determine the relationship between the sender and the user 314. For example, the retrieved Internet browsing information 320 may include information associated with a browsing history of the user 314 on an e-commerce website (such as, the user 314 searched for a new mobile phone or a laptop) and the extracted body information 304B of the first message 302A (i.e. originated with the robot machine and remain undelivered) may include information or words associated with shipping details of a package from the e-commerce website (i.e. sender of the first message 302A). Based upon the analysis of the retrieved Internet browsing information 320 and the one or more words included in the extracted body information 304B, the circuitry 202 may determine that the first message 302A may be relevant to the user 314 associated with the recipient device 312 and the sender (for example the e-commerce website) may be in the relationship with the user 314 (i.e. current customer of the e-commerce website) of the recipient device 312. For example, the circuitry 202 may compare the number of similar words in the Internet browsing information 320 and in the body information 304B to determine the relationship between the sender of the first message 302A and the user 314 associated with the recipient device 312. In some embodiments, the circuitry 202 may be configured to compare the Internet browsing information 320 (for example accessed URLs, website address, or email address) of last few hours/days, and the sender information 304A (i.e. email address of the sender website or application) in the first message 302A (i.e. current message) to determine the relationship between the sender of the first message 302A and the user 314 associated with the recipient device 312 or the relevance of the first message 302A for the user 314.

In accordance with an embodiment, the circuitry 202 may be configured to analyze information related to a number of messages received by the recipient device 312 from the sender device (e.g., the first sender device 106A). Based on such analysis, the circuitry 202 may be configured to determine the relationship between the sender of the first message 302A and the user 314 associated with the recipient device 312. For example, if the number of messages received by the recipient device 312 from the sender device (e.g., the first sender device 106A) in a certain time period exceeds the certain threshold value, the circuitry 202 may determine that the sender associated with the sender device and the user 314 may be associated or related with each other. In such scenario, the first message 302A may be a relevant or important message for the user 314.

In accordance with an embodiment, the circuitry 202 may be configured to transmit the extracted sender information 304A (for example the phone number or email address of the sender) to one or more servers (such as, the plurality of second servers 110). The circuitry 202 may be further configured to receive information from the one of the plurality of second servers 110 based on the transmitted sender information 304A. Based on the information received from the one or more servers, the circuitry 202 may be configured to determine the relationship between the sender of the first message 302A and the user 314 associated with the recipient device 312. In an embodiment, the received information may indicate an association between the sender information 304A (or the sender indicated by the sender information 304A) and a service, where the user 314 associated with the recipient device 312 may be registered with the service. Examples of the service may include, but are not limited to, a service provided by financial institutions (such as, banks), a service provided by government institutions, a service provided by educational institutions, a service provided by a health institution, a service provided by a sport institution, or a service provided by various applications (such as, a grocery application, a food delivery application). For example, the user 314 may be associated with services provided by a gym institution and the sender information 304A may be contact information of the gym institution. The circuitry 202 may transmit the sender information 304A and recipient information (i.e. included in the first message 302A) to the one of the plurality of second servers 110 which may be associated with the gym institution. Based on the received sender information 304A and the recipient information, the one of the plurality of second servers 110 may determine that the recipient device 312 (indicated by the recipient information) or the associated user 314 may be registered with the service provided by the sender (for example gym institution) of the first message 302A. In some embodiments, the plurality of second servers 110 may not be directly associated with the sender of the first message 302A, but may store the information about the registration of the user 314 or the recipient device 312 with the sender (or the sender device) of the first message 302A. Therefore, based on the transmission of the extracted sender information 304A and the recipient information (i.e. extracted from the first message 302A), and the determination of the registration, the circuitry 202 may determine the relationship between the sender of the first message 302A and the user 314 associated with the recipient device 312. The first message 302A received from the sender may be relevant to the user 314 of the recipient device 312, in case the sender provides the service with which the user 314 or the recipient device 312 is already registered. Therefore, the disclosed electronic device 102 may determine the relationship between the sender of the first message 302A and the user 314 associated with the recipient device 312 based on one or combination of factors, such as (but not limited to), number of messages transferred in recent past between the sender device and the recipient device 312, the schedule information 316, or the Internet browsing information 320.

At 308, an importance score may be determined. In one or more embodiments, the circuitry 202 may be configured to determine a first importance score for the first message 302A. The circuitry 202 may be configured to determine the first importance score for the first message 302A based on the determined relationship between the sender of the first message 302A and the user 314 associated with the recipient device 312. The first importance score may correspond to importance of the first message 302A for the user 314 or the recipient device 312, determined based on the relationship between the sender of the first message and the user 314 associated with the recipient device 312. In an embodiment, the first importance score may a value between 0 to 1.

In accordance with an embodiment, the circuitry 202 may be further configured to determine a plurality of importance scores for the retrieved set of messages (including the first message 302A) based on the determined relationship between a sender and a user associated with a corresponding recipient device of each of the retrieved set of messages. The circuitry 202 may be configured to determine the first importance score for each message of the retrieved set of messages based on the determined relationships between the corresponding sender and the users associated with the corresponding recipient device of each of the retrieved set of messages. The circuitry 202 may be configured to determine the first importance score based on certain factors, but are not limited to, the schedule information 316 of the user 314, the information related to past message 318, the Internet browsing information 320 of the recipient device 312, or the registered services of the sender for the user 314 of the recipient device 312.

In an embodiment, the circuitry 202 may be configured to extract priority information from the memory 204, where the priority information may indicate different predefined priorities for the aforementioned factors used to determine the relationships for each undelivered message. For example, the schedule information 316 may have higher priority than the information related to past messages 318 or the Internet browsing information 320. In other words, in case the relationship for a first message is determined based on the schedule information 316 and the relationship for a second message is determined based on the information related to past messages 318, then the importance score for the first message may be higher than the importance score for the second message. The priority information predefined in the memory 204 may be different or specific to each of the corresponding recipient device 312 of the plurality of recipient devices 104. In some embodiments, the circuitry 202 may be configured to receive the priority information, as the user input, from the recipient device 312. In some other embodiments, the circuitry 202 may be configured to change a priority order (i.e. indicated by the priority information) for the recipient device 312 based on an utilization (or a frequency of consideration) of a particular factor to determine the relationship. For example, in case the circuitry 202 determines the relationship for last predefined N number of undelivered message mostly based on the particular factor (such as the Internet browsing information 320), then the priority order for the Internet browsing information 320 may be increased in comparison to other factors utilized to determine the relationship as described at 306 in FIG. 3. Similarly, the circuitry 202 may dynamically change the priority order on run-time basis for different factors utilized to determine the relationship, and accordingly determine the first importance score for a particular undelivered message based on the priority order of the corresponding factor utilized for the determination of the relationship between the sender of the first message 302A and the user 314 associated with the recipient device 312.

In accordance with an embodiment, the priority order may be defined for the plurality of sender devices 106 with respect to a particular recipient device (such as the recipient device 312). In an example, in past, the recipient device 312 sent at least one message to the first sender device 106A and no message sent to the second sender device 106B. In such case, the priority given to the first sender device 106A is higher than the second sender device 106B for the undelivered message for the first recipient device 104A. The circuitry 202 may be configured to determine the sender device of the first message 302A based on the extracted sender information 304A and extract the predefined priority for the sender device to determine the first importance score for the first message 302A. In example, an undelivered message received from the first sender device 106A may have a higher importance score than another undelivered message received from the second sender device 106B. In another example, the user 314 of the recipient device 312 may be registered with a service 'A' (e.g. a fast-food joint or a restaurant) and may not be registered with a service 'B' (e.g., a gym). In such example, the undelivered message received from the sender device associated with the service 'A' may have the higher importance score than the undelivered message received from the sender device associated with the service 'B'.

In accordance with an embodiment, the circuitry 202 may be further configured to transmit the first message 302A to the recipient device 312 based on the determined first importance score for the first message 302A. The transmitted first message 302A may be further displayed on a display device (not shown) associated with the recipient device 312. The recipient device 312 may alert the user 314 about the receipt of the first message 302A based on different notifications (like audible alert, visual alert, or vibration alert). In some embodiments, the notification may be based on the first importance score of the received first importance score. For example, a volume or tone of the audible alert of a message with higher importance score may be higher than a threshold sound. In accordance with an embodiment, the circuitry 202 may be configured to transmit a list of important messages 322 to the recipient device 312 based on the determined first importance score for each of the important messages 322. In an embodiment, the list of important messages 322 may be displayed in a decreasing order of the first importance score determined for each important message. The list of important messages 322 may include a summary for each important message including the sender information 304A and an introductory content of the body information 304B. In some embodiments, the list of important messages 322 may further include a list of top N messages (for example top five messages) having higher first importance score as compared to the first importance score associated with remaining messages of the retrieved set of messages.

In accordance with an embodiment, the circuitry 202 may be configured to transmit one or more messages of the retrieved set of messages to the corresponding recipient device based on a comparison between the determined plurality of importance scores and a score threshold. The memory 204 may be configured to store the score threshold for the retrieved set of messages for the corresponding recipient device. The circuitry may be configured to retrieve the stored score threshold from the memory 204 or a server (such as the first server 108). The score threshold may correspond to a predefined score for the selection and the transmission of the one or more messages from the retrieved set of messages. In an example, the circuitry 202 may be configured to select and transmit the one or more messages to the corresponding recipient device for which the corresponding first importance score is more than the score threshold (for example 0.5). The circuitry 202 may ignore the remaining messages of the retrieved set of messages for the transmission. In some embodiments, the electronic device 102 may receive the score threshold, as the user input, from the recipient device (such as the recipient device 312). Therefore, the first importance score based transmission of the list of important messages 322 (from the undelivered messages 310) may ensure that important or relevant messages associated with the user 314 may be automatically delivered to the recipient device 312, and may not be missed even if the messages are restricted or blocked based on the message blocking criteria, such as the CAPTCHA test to restrict robo-messages. Examples of such important messages may include, but are not limited to, alerts associated with bank transactions, one-time password (OTP) related transactions, examination details, important schedule messages, or online order updates. Further, based on the first importance score of each message and the score threshold, the disclosed electronic device 102 may not include the unwanted messages (or low importance score messages) in the list of important messages 322, and may not further transmit such unwanted messages to the recipient device 312 of the user 314, and thereby avoid unnecessarily disturbance for the user 314 of the recipient device 312.

In accordance with an embodiment, the circuitry 202 may be further configured to transmit the determined first importance score with the first message 302A to the recipient device 312. Based on the transmitted first message 302A and the first importance score, the circuitry 202 may be configured to receive the user input from the recipient device 312. The user input may indicate a request from the recipient device 312 to transmit all messages from a corresponding sender associated with the first message 302A in future. The circuitry 202 may be further configured to update a white-listed sender list (i.e. associated with the recipient device 312) with the sender information 304A, based on the received user input. The circuitry 202 may be further configured to transmit one or more of the set of messages to the recipient device 312 based on the updated white-listed sender list. The one or more of the set of messages may correspond to the sender information 304A or received from the same sender device (such as the first sender device 106A). Based on the updated white-listed sender list including the sender information 304A of the first sender device 106A, the circuitry 202 of the electronic device 102 may be configured to transmit all the messages received from the first sender device 106A in future, without any application of a message blocking criteria (such as CAPTCHA test) on received messages from the first sender device 106A.

In an embodiment, the white-listed sender list for the particular recipient device (such as the recipient device 312) may include a list of senders or the sender devices that may be allowed by the user 314 of the recipient device 312. Based on the white-listed sender list, the circuitry 202 may notify the recipient device 312 when the messages are received from the senders or the sender devices associated with the white-listed sender list. Further, the circuitry 202 may be configured to directly transmit the messages received from the senders or the sender devices included in the white-listed sender list for the first recipient device 104A. Therefore, the user 314 associated with the recipient device 312 may always receive the messages transmitted by the senders or the sender devices indicated in the white-listed sender list, thereby ensuring that the user 314 receives important messages from the whitelisted senders.

Figure 4:
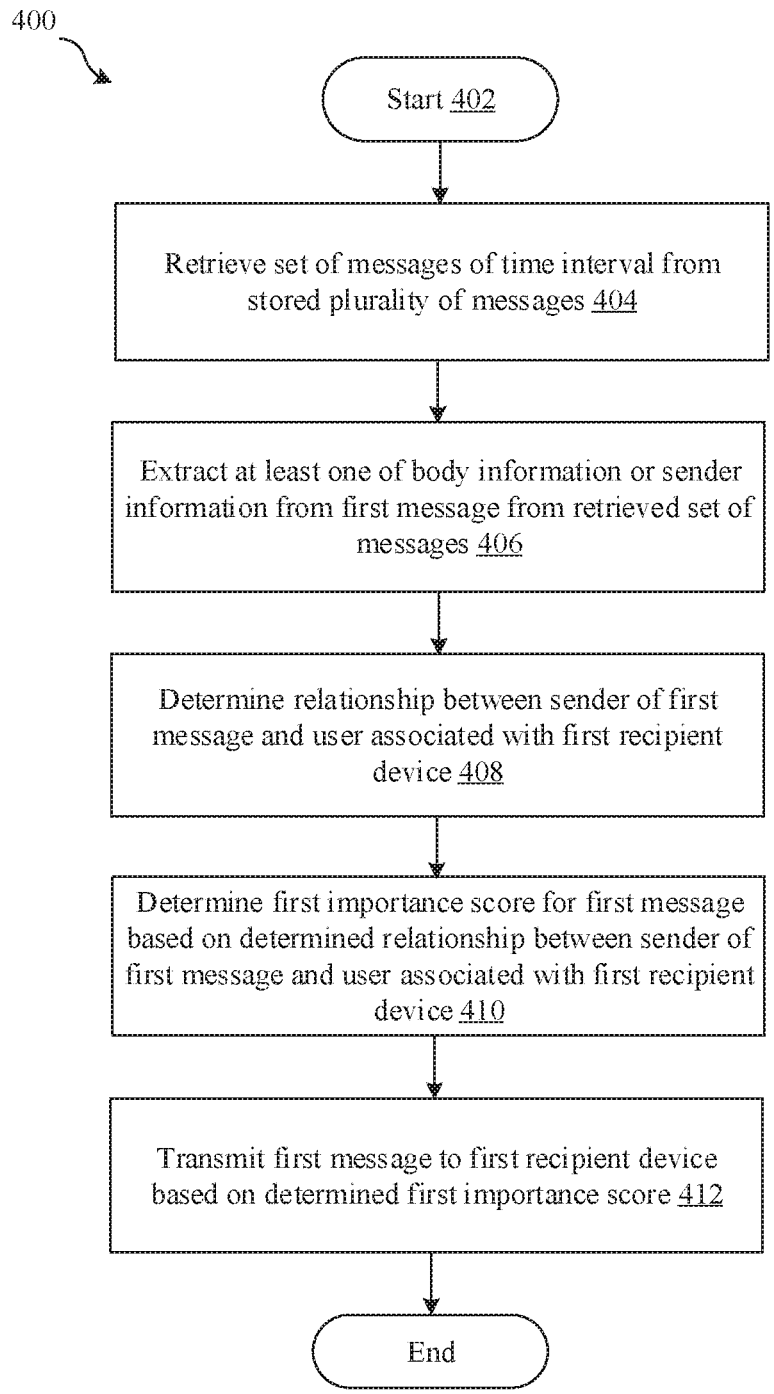
FIG. 4 is a flowchart that illustrates exemplary operations for importance determination for undelivered message, in accordance with an embodiment of the disclosure.

FIG. 4 is a flowchart that illustrates exemplary operations for importance determination for undelivered messages, in accordance with an embodiment of the disclosure. FIG. 4 is described in conjunction with elements from FIGS. 1, 2, and 3. With reference to FIG. 4, there is shown a flowchart 400. The operations from 402 to 412 may be implemented by any computing system, such as by the electronic device 102 of FIG. 1 or the circuitry 202 of FIG. 2. The electronic device 102 may include a memory (such as, the memory 204) configured to store a plurality of messages which may be undelivered messages (such as, the undelivered messages 310) and may be associated with a plurality of recipient devices (such as, the plurality of recipient devices 104). The operations may start at 402 and proceed to 404.

At 404, a set of messages of a time interval from the stored plurality of messages may be retrieved. In one or more embodiments, the circuitry 202 may be configured to retrieve the set of messages of the time interval from the stored plurality of messages. The set of messages may be associated with the first recipient device 104A of the plurality of recipient devices 104. The retrieval of the set of messages is described, for example, at 302 in FIG. 3.

At 406, at least one of the body information 304B or the sender information 304A may be extracted from the first message 302A from the retrieved set of messages. In one or more embodiments, the circuitry 202 may be configured to extract at least one of the body information 304B or the sender information 304A from the first message 302A from the retrieved set of messages. The extraction of the body information 304B or the sender information 304A is described, for example, at 304 in FIG. 3.

At 408, a relationship between a sender of the first message 302A and a user (such as, the user 314) associated with the first recipient device (such as, the recipient device 312) may be determined. In one or more embodiments, the circuitry 202 may be configured to determine the relationship between the sender of the first message 302A and the user 314 associated with the recipient device 312, based on one or more words included in the extracted body information 304B or based on the extracted sender information 304A. Certain factors which may be used in the determination of the relationship may include, but are not limited to, the schedule information 316 of the user 314, the information related to past messages 318 communicated between the recipient device 312 and the corresponding sender device, the Internet browsing history of the recipient device 312, or the registered services for the user 314 of the recipient device 312. The determination of the relationship between the sender of the first message 302A and the user 314 is described, for example, at 306 in FIG. 3.

At 410, a first importance score for the first message 302A may be determined. In one or more embodiments, the circuitry 202 may be configured to determine the first importance score for the first message 302A based on the determined relationship between the sender of the first message 302A and the user 314 associated with the recipient device 312. The determination of the first importance score for the first message 302A is described, for example, at 308 in FIG. 3.

At 412, the first message 302A may be transmitted to the recipient device 312. In one or more embodiments, the circuitry 202 may be configured to transmit the first message 302A to the recipient device 312 based on the determined first importance score, as described, for example, in FIG. 3. Control may pass to end.

Although the flowchart 400 is illustrated as discrete operations, such as 404, 406, 408, 410 and 412, the disclosure is not so limited. Accordingly, in certain embodiments, such discrete operations may be further divided into additional operations, combined into fewer operations, or eliminated, depending on the particular implementation without detracting from the essence of the disclosed embodiments Various embodiments of the disclosure may provide a non-transitory computer-readable medium and/or storage medium having stored thereon, instructions executable by a machine and/or a computer (such as the electronic device 102). The computer-executable instructions may cause the machine and/or computer to perform operations that may include retrieval of a set of messages of a time interval from a stored plurality of messages of a plurality of recipient devices. The set of messages may be associated with a first recipient device of the plurality of recipient devices. The operations may further include extraction of at least one of body information or sender information from a first message from the retrieved set of messages. The operations may further include determination of a relationship between a sender of the first message and a user associated with the first recipient device, based on one or more words included in the extracted body information or based on the extracted sender information. The operations may further include determination of a first importance score for the first message based on the determined relationship between the sender of the first message and the user associated with the first recipient device. The operations may further include transmission of the first message to the first recipient device based on the determined first importance score.

Exemplary aspects of the disclosure may include an electronic device (such as, the electronic device 102 of FIG. 1) that may include a memory (such as, the memory 204 of FIG. 2) and circuitry (such as, the circuitry 202) coupled to the memory 204. The memory 204 may be configured to store a plurality of messages, which may be undelivered messages (such as, the undelivered messages 310) that may be associated with a plurality of recipient devices (such as, the plurality of recipient devices 104). The circuitry 202 may be configured to retrieve a set of messages of a time interval from the stored plurality of messages. The set of messages may be associated with a first recipient device (such as, the first recipient device 104A) of the plurality of recipient devices 104. The circuitry 202 may be further configured to extract at least one of body information (such as, the body information 304B) or sender information (such as, the sender information 304A) from a first message (such as, the first message 302A) from the retrieved set of messages. The circuitry 202 may be further configured to determine a relationship between a sender of the first message 302A and a user (such as, the user 114) associated with the first recipient device 104A, based on one or more words included in the extracted body information 304B or based on the extracted sender information 304A. Based on the determined relationship between the sender of the first message 302A and the user 114 associated with the first recipient device 104A, the circuitry 202 may be configured to determine a first importance score for the first message 302A. The circuitry 202 may be configured to transmit the first message 302A to the first recipient device 104A based on the determined first importance score.

In accordance with an embodiment, the circuitry 202 may be configured to retrieve schedule information (such as, the schedule information 316), corresponding to the user 114 associated with the first recipient device 104A, from a server (such as, the first server 108). Based on the retrieved schedule information 316 and the one or more words included in the extracted body information 304B, the circuitry 202 may be configured to determine the relationship between the sender of the first message 302A and the user 114 associated with the first recipient device 104A.

In accordance with an embodiment, the circuitry 202 may be configured to retrieve information related to past messages (such as, the information related to past messages 318) transmitted from the first recipient device 104A to a sender device (such as, one of the plurality of sender devices 106) which may be associated with the sender information 304A extracted from the first message 302A. The circuitry 202 may be further configured to compare the retrieved information related to the past messages 318 and the sender information 304A extracted from the first message 302A. The circuitry 202 may be further configured to analyze information related to a number of the past messages transmitted in a first time-period from the first recipient device 104A to the sender device for the comparison. Based on the comparison, the circuitry 202 may be configured to determine the relationship between the sender of the first message 302A and the user 114 associated with the first recipient device 104A.

In accordance with an embodiment, the circuitry may be configured to retrieve Internet browsing information (such as, the Internet browsing information 320) related to the first recipient device 104A from one of a server or the first recipient device 104A. Based on the retrieved Internet browsing information 320 and one of the one or more words included in the extracted body information 304B or the extracted sender information 304A, the circuitry may be configured to determine the relationship between the sender of the first message and the user 114 associated with the first recipient device 104A.

In accordance with an embodiment, the circuitry 202 may be configured to receive a user input from the first recipient device 104A. Based on the received user input, the circuitry 202 may be further configured to set the time interval for the retrieval of the set of messages from the stored plurality of messages. In accordance with an embodiment, the undelivered messages may correspond to messages which failed a captcha test between the first recipient device 104A and a sender device.

In accordance with an embodiment, the circuitry 202 may be configured to extract at least one of the body information 304B or the sender information 304A of each of the retrieved set of messages. Based on the relationship between a sender and a user associated with a corresponding recipient device of each of the retrieved set of messages, the circuitry may be configured to determine a plurality of importance scores for the retrieved set of messages. The circuitry 202 may be further configured to transmit one or more messages of the retrieved set of messages to the corresponding recipient device based on a comparison between the determined plurality of importance scores and a score threshold.

In accordance with an embodiment, the circuitry 202 may be configured to transmit the extracted sender information 304A to one or more servers (such as, the plurality of second servers 110). Based on the information received from the one or more servers, the circuitry 202 may be configured to determine the relationship between the sender of the first message 302A and the user 114 associated with the first recipient device 104A. The received information indicates an association between the sender information 304A and a service, where the user 114 associated with the first recipient device 104A may be registered with the service.

In accordance with an embodiment, the circuitry 202 may be further configured to transmit the first importance score with the first message 302A to the first recipient device 104A. Based on the transmitted first message 302A and the first importance score, the circuitry may be configured to receive a user input from the first recipient device 104A. The circuitry 202 may be further configured to update a white-listed sender list, associated with the first recipient device 104A, with the sender information 304A based on the received user input. In accordance with an embodiment, the circuitry may be configured to transmit one or more of the set of messages to the first recipient device 104A based on the updated white-listed sender list. The one or more of the set of messages correspond to the sender information 304A. In accordance with an embodiment, the undelivered messages may correspond to one of an electronic mail (e-mail), a short message service (SMS) message, a multimedia message service (MMS) message, or an instant message.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
a memory configured to store a plurality of messages which are undelivered messages and are associated with a plurality of recipient devices;
a circuitry coupled to the memory, wherein the circuitry is configured to:
retrieve a set of messages of a time interval from the stored plurality of messages, wherein the set of messages are associated with a first recipient device of the plurality of recipient devices;
extract at least one of body information or sender information from a first message from the retrieved set of messages;
determine a relationship between a sender of the first message and a user associated with the first recipient device, based on one or more words included in the extracted body information or based on the extracted sender information;
determine a first importance score for the first message based on the determined relationship between the sender of the first message and the user associated with the first recipient device; and transmit the first message to the first recipient device based on the determined first importance score.

2. The electronic device according to claim 1, wherein the circuitry is further configured to:

retrieve schedule information, corresponding to the user associated with the first recipient device, from a server; and determine the relationship between the sender of the first message and the user associated with the first recipient device, based on the retrieved schedule information and the one or more words included in the extracted body information.

3. The electronic device according to claim 1, wherein the circuitry is further configured to:

retrieve information related to past messages transmitted from the first recipient device to a sender device which is associated with the sender information extracted from the first message;

compare the retrieved information related to the past messages and the sender information extracted from the first message; and determine the relationship between the sender of the first message and the user associated with the first recipient device based on the comparison.

4. The electronic device according to claim 3, wherein for the comparison, the circuitry is further configured to analyze information related to a number of the past messages transmitted in a first time-period from the first recipient device to the sender device.

5. The electronic device according to claim 1, wherein the circuitry is further configured to:

retrieve Internet browsing information related to the first recipient device from one of a server or the first recipient device; and determine the relationship between the sender of the first message and the user associated with the first recipient device based on the retrieved Internet browsing information and one of the one or more words included in the extracted body information or the extracted sender information.

6. The electronic device according to claim 1, wherein the circuitry is further configured to:

receive a user input from the first recipient device; and set the time interval for the retrieval of the set of messages from the stored plurality of messages based on the received user input.

7. The electronic device according to claim 1, wherein the undelivered messages correspond to messages which failed a captcha test between the first recipient device and a sender device.

8. The electronic device according to claim 1, wherein the circuitry is further configured to:

extract at least one of the body information or the sender information of each of the retrieved set of messages;

determine a plurality of importance scores for the retrieved set of messages based on the relationship between a sender and a user associated with a corresponding recipient device of each of the retrieved set of messages; and transmit one or more messages of the retrieved set of messages to the corresponding recipient device based on a comparison between the determined plurality of importance scores and a score threshold.

9. The electronic device according to claim 1, wherein the circuitry is further configured to:

transmit the extracted sender information to one or more servers; and determine the relationship between the sender of the first message and the user associated with the first recipient device based on information received from the one or more servers, wherein the received information indicates an association between the sender information and a service, and wherein the user associated with the first recipient device is registered with the service.

10. The electronic device according to claim 1, wherein the circuitry is further configured to:

transmit the first importance score with the first message to the first recipient device;

receive a user input from the first recipient device based on the transmitted first message and the first importance score; and update a white-listed sender list, associated with the first recipient device, with the sender information based on the received user input.

11. The electronic device according to claim 10, wherein the circuitry is further configured to transmit one or more of the set of messages to the first recipient device based on the updated white-listed sender list, and wherein the one or more of the set of messages correspond to the sender information.

12. The electronic device according to claim 1, wherein the undelivered messages correspond to one of an electronic mail (e-mail), a short message service (SMS) message, a multimedia message service (MMS) message, or an instant message.

13. A method, comprising:

in an electronic device which includes a memory configured to store a plurality of messages which are undelivered messages and are associated with a plurality of recipient devices:

retrieving a set of messages of a time interval from the stored plurality of messages, wherein the set of messages are associated with a first recipient device of the plurality of recipient devices;

extracting at least one of body information or sender information from a first message from the retrieved set of messages;

determining a relationship between a sender of the first message and a user associated with the first recipient device, based on one or more words included in the extracted body information or based on the extracted sender information;

determining a first importance score for the first message based on the determined relationship between the sender of the first message and the user associated with the recipient device; and transmitting the first message to the first recipient device based on the determined first importance score.

14. The method according to claim 13, further comprising:

retrieving schedule information, corresponding to the user associated with the first recipient device, from a server; and determining the relationship between the sender of the first message and the user associated with the first recipient device, based on the retrieved schedule information and the one or more words included in the extracted body information.

15. The method according to claim 13, further comprising:
receiving a user input from the first recipient device; and
setting the time interval for the retrieval of the set of messages from the stored plurality of messages based on the received user input.

16. The method according to claim 13, wherein the undelivered messages correspond to messages which failed a captcha test between the first recipient device and a sender device.

17. The method according to claim 13, further comprising:
extracting at least one of the body information or the sender information of each of the retrieved set of messages;
determining a plurality of importance scores for the retrieved set of messages based on the relationship between a sender and a user associated with a corresponding recipient device of each of the retrieved set of messages; and
transmitting one or more messages of the retrieved set of messages to the corresponding recipient device based on a comparison between the determined plurality of importance scores and a score threshold.

18. The method according to claim 13, further comprising:
transmitting the first importance score with the first message to the first recipient device;
receiving a user input from the first recipient device based on the transmitted first message and the first importance score; and
updating a white-listed sender list, associated with the first recipient device, with the sender information based on the received user input.

19. The method according to claim 13, wherein the undelivered messages correspond to one of an electronic mail (e-mail), a short message service (SMS) message, a multimedia message service (MMS) message, or an instant message.

20. A non-transitory computer-readable medium having stored thereon, computer-executable instructions that when executed by an electronic device, causes the electronic device to execute operations, the operations comprising:
retrieving a set of messages of a time interval from a stored plurality of messages of a plurality of recipient devices, wherein the set of messages are associated with a first recipient device of the plurality of recipient devices;
extracting at least one of body information or sender information from a first message from the retrieved set of messages;
determining a relationship between a sender of the first message and a user associated with the first recipient device, based on one or more words included in the extracted body information or based on the extracted sender information;
determining a first importance score for the first message based on the determined relationship between the sender of the first message and the user associated with the recipient device; and
transmitting the first message to the recipient device based on the determined first importance score.

* * * * *